Nov. 18, 1952        E. G. GOEDHART        2,618,184
DEVICE FOR EXPANDING LENS OPENINGS
Filed Sept. 29, 1949
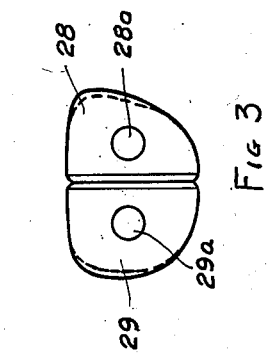
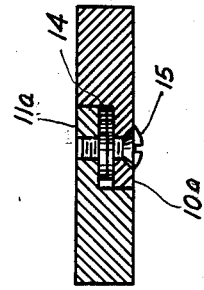
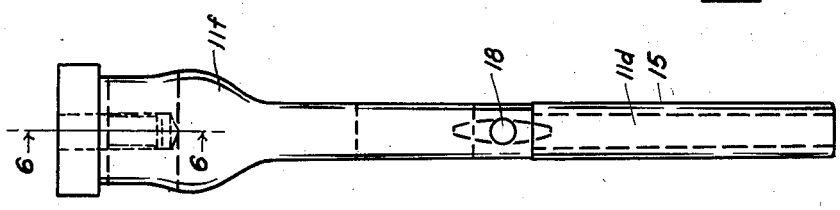
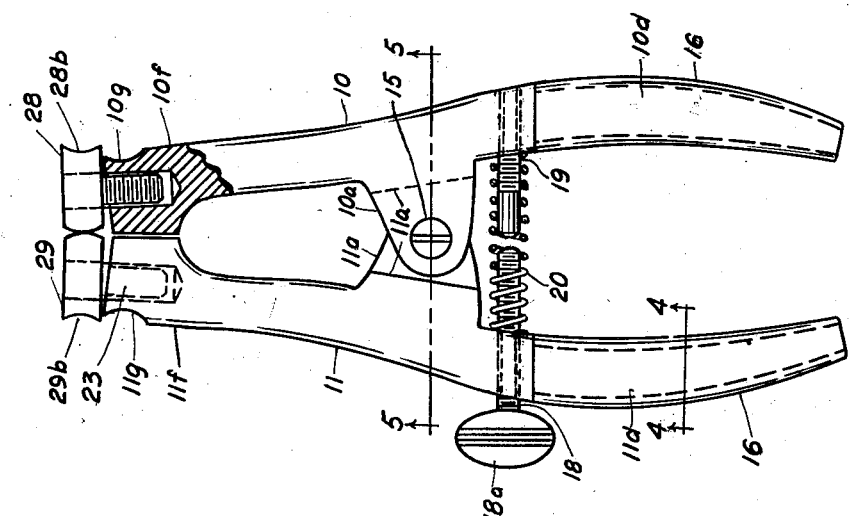
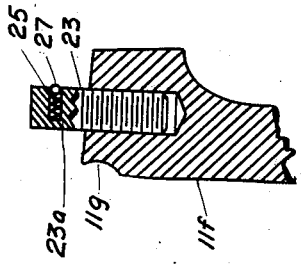
INVENTOR
EDWARD G. GOEDHART
By Chas. E. Pez
ATTORNEY Patented Nov. 18, 1952

2,618,184

UNITED STATES PATENT OFFICE 2,618,184

DEVICE FOR EXPANDING LENS OPENINGS

Edward G. Goedhart, Minneapolis, Minn.

Application September 29, 1949, Serial No. 118,693

2 Claims. (Cl. 81—3.6)

This invention relates to a device for expanding lens openings in eyeglass frames. It is particularly desirable to have a device with a controlled expansion in accordance with the operator's needs. It is also desirable to have a device with removable and exchangeable lens opening expanding members so that said device can be adapted for use with a wide variety of shapes of lens openings.

It is an object of this invention to provide a device for the expansion of lens openings which has an easily adjustable control means for said expansion.

It is another object of this invention to provide a device for expanding lens openings which has removable and exchangeable lens opening expanding members to adapt said device for use with various shaped lens openings.

It is still another object of this invention to provide a device with oscillatable members for expanding lens openings so that the stress on the frame will be evenly distributed.

It is more particularly an object of this invention to provide a device having in combination, a pair of levers pivotally connected and provided with handles, a jaw carried by each lever, said jaws adapted to be used as lens opening expanders, a pin secured in each jaw, a lens opening expanding member oscillatably and removably secured to each pin, and the means for adjustably controlling the expansion of said device.

These and other objects and advantages of the invention will be fully set forth in the following description made in connection with the accompanying drawings in which like reference characters refer to similar parts throughout the several views and in which:

Fig. 1 is a view of the applicant's device in front elevation with some parts broken away and some parts shown in vertical section;

Fig. 2 is a view in side elevation;

Fig. 3 is a top plan view of the lens opening expanding members;

Fig. 4 is a view in horizontal section taken on line 4—4 of Fig. 1, as indicated by the arrows;

Fig. 5 is a view in horizontal section taken on line 5—5 of Fig. 1, as indicated by the arrows; and Fig. 6 is a view in vertical section taken on line 6—6 of Fig. 2, as indicated by the arrows, with a part broken away and shown on an enlarged scale.

Referring to the drawings, a device for expanding the lens openings in eyeglass frames is shown in Fig. 1 comprising a pair of levers 10 and 11. Said levers can be made of any suitable material, preferably such material as aluminum which is light in weight. Said levers are provided with lug portions 10a and 11a respectively of reduced thickness outwardly of lines 11c. Said lug portions are shown as having rounded ends. As shown in Fig. 5, said lugs are arranged in superposed relation and anti-friction washers 14 are disposed between said superposed portions of lugs 10a and 11a. A headed screw 15 extends through lug portion 10a and is threaded into lug portion 11a. Said screw passes through washers 14. Screw 15 has its rounded head countersunk into the lug 11a.

Thus levers 10 and 11 are pivotally connected by said screw 15 and are swingable about the axis thereof. Said levers 10 and 11 have handle portions 10d and 11d respectively of slightly reduced cross section being slightly curved with their convex sides outwardly. Handle portions 10d and 11d are enclosed in tubular coverings 16 preferably made of yielding and resilient material. The outer sides of members 16 are substantially flush with the respective surfaces of members 10 and 11.

A thumb screw 18 is threaded into and extends through lever 11 adjacent the handle portion 11d, the same having a head 18a. A pin 19 is threaded into lever 10 from the inner side thereof adjacent the handle 10d. Screw 18 and pin 19 extend transversely of levers 10 and 11 and are in substantial axial alignment. Said screws have their inwardly exposed portions disposed in a coiled compression spring 20, the ends of which engage the inner sides of levers 10 and 11 respectively.

Said levers have at their upper ends jaw portions 10f and 11f. The inner sides of said jaw portions have substantially abutting vertical surfaces. The top plane of said jaws 10f and 11f is inclined slightly downwardly and inwardly. Said jaw portions are respectively provided with curved grooves 10g and 11g adjacent their outer upper edge portions. Pins 23 are secured into the tops of said jaw portions in any suitable manner, as by being threaded therein. Said pins project approximately perpendicularly to the top surfaces of said jaw portions and project a short distance thereabove. Each pin 23 is provided at one side with a cylindrical bore 23a. Disposed in the bottom portion of each bore is a small coiled compression spring 25, the outer side of which engages a ball 27 disposed in said bore and held therein by the inwardly turned edges of said bore.

Adapted to be respectively placed and removably held on said pins 23 are lens expanding members 28 and 29. Each of said members is provided with a bore 28a and 29a respectively adapted to fit on pins 23 and be frictionally held thereon by said ball 27. Said lens opening expanding members are variously shaped about their periphery about three sides thereof to fit various sizes and shapes of lens openings. Said members 28 and 29 are provided at their remote sides with slightly arced grooves 28b and 29b, segment shaped in cross section. Members 28 and 29 have engaging surfaces which are respectively convex in a generally vertical direction but are rectilinear in horizontal direction.

In operation the lens opening expanding members are first placed on said jaws 10f and 11f respectively, as shown in Fig. 1, and the same are frictionally held in position by said pins 23 and balls 27. The thumb screw 18 is then adjusted to allow the amount of expansion of said members as is desired by the operator. The extent of the expansion of said members is fixed by the space between the inwardly exposed ends of said thumb screw 18 and pin 19. Said end surfaces move toward each other when the handles of the device are moved toward each other, thereby expanding or separating the members 28 and 29.

The device is then held by the handle portions and the members 28 and 29 are positioned in the lens opening of the eyeglass frame and substantially fit therein. The opposite ends of the frame about the lens opening fit nicely in the grooves 28b and 29b. The eyeglass frame has been prepared previously for expansion by being heated to the proper degree of temperature. As the handles of the device are pressed toward each other, the members 28 and 29 are separated, the frame is stretched and the lens opening is expanded. The grooves 28b and 29b prevent movement of the frame transversely thereof. When the members 28 and 29 are moved apart, they will oscillate somewhat about the axes of pins 23 so that they will adjust themselves to the lens opening and engage the greatest possible extent of the same. This gives an even distribution of stress about the lens opening. This same movement results in a uniform stretching of the frame about said opening.

The lens opening expanding members are interchangeable to fit and properly expand various types and shapes of lens openings. For an ordinary type of lens opening, the jaws 10f and 11f of said device may be used instead of the members 28 and 29. The frame will be placed in the grooves 10g and 11g and the operation is as described.

Thus it is seen that I have provided a very simple and highly efficient lens opening expanding device. By the use of this device, lens openings of many shapes may be easily and quickly expanded. In the use of this device all chance of injury to eyeglass frames in the lens opening expanding operation is eliminated. The device has been amply demonstrated in actual practice and found to be very successful and efficient in operation and it is now being commercially made.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A device for expanding the lens openings of an eyeglass frame having in combination, a pair of levers pivotally connected intermediate their ends respectively having handle portions at one end and jaw portions at the other end, a securing means in each jaw having axes extending longitudinally of said levers, a lens opening expanding member frictionally held on each securing means, said members having a periphery with an arc-shaped groove in the outer sides thereof, said lens opening expanding members adapted to be received in said lens openings, said groove adapted to be disposed substantially about the inner edge portion of said lens openings transversely thereof, said members being oscillatable about the axes of said securing means respectively whereby said members are readily adapted to be accommodated to the curvature of the inner edge portion of said lens openings so as to secure a large contact with said frames.

2. A device for expanding the lens openings of an eyeglass frame having in combination, a pair of levers pivotally connected intermediate their ends respectively having handle portions at one end and jaw portions at the other end, means to limit the separation of said jaw portions, pins respectively extending upwardly from each of said jaw portions, said pins respectively having lower threaded portions removably secured in said jaw portions, a cylindrical and transverse bore provided in the side of each of said pins, a spring disposed in each of said bores, a ball engaging said spring and projecting slightly beyond the periphery of each of said pins and secured therein, a pair of lens opening expanding members having openings for receiving said pins respectively and frictionally held on said pins by said balls respectively, said lens opening expanding members respectively having an outer periphery having a groove thereabout concave in cross section, said groove being adapted to be disposed substantially transversely about the inner edge portions of said lens openings, said lens opening expanding members being oscillatably held by said pins whereby said members will readily accommodate themselves to the curvature of the inner edge portions of said lens openings and will engage the greatest possible length thereof.

EDWARD G. GOEDHART.

REFERENCES CITED

The following references are of record in the file of this patent:

UNITED STATES PATENTS

| Number | Name | Date |
|---|---|---|
| 448,451 | Miller | Mar. 17, 1891 |
| 753,456 | Weidinger | Mar. 1, 1904 |
| 1,219,160 | Rosenblatt | Mar. 13, 1917 |
| 1,507,534 | Wason | Sept. 2, 1924 |
| 1,750,121 | Ottinger | Mar. 11, 1930 |
| 2,471,372 | Jankovich | May 24, 1949 |
| 2,488,484 | Vander Clute | Nov. 15, 1949 |

FOREIGN PATENTS

| Number | Country | Date |
|---|---|---|
| 666,794 | France | May 28, 1929 |